Aug. 21, 1923.

J. B. PATTON

TESTING INSTRUMENT

Filed Sept. 30, 1922

1,465,314

INVENTOR
John B. Patton

BY
ATTORNEY

Patented Aug. 21, 1923.

1,465,314

UNITED STATES PATENT OFFICE.

JOHN B. PATTON, OF PLAINFIELD, NEW JERSEY.

TESTING INSTRUMENT.

Application filed September 30, 1922. Serial No. 591,497.

*To all whom it may concern:*

Be it known that I, JOHN B. PATTON, a citizen of the United States, and a resident of Plainfield, county of Union, State of New Jersey, have invented certain new and useful Improvements in Testing Instruments, of which the following is a specification.

My invention relates to testing instruments or tools of a character adapted for testing liquids, solutions, liquors or the like to ascertain either the presence or absence of various substances or salts in such liquids, and also the quantity or proportions of the salts or substances contained or dissolved therein.

Among the objects of my invention is the provision of an instrument or tool of the character indicated that will automatically measure definite quantities of liquid to be tested such that the addition thereto of known quantities of the test reagents will not only indicate the presence or absence of certain substances in the liquid being tested but also the strength of the solution or the proportions in which such substances are present. That is, my invention provides both a qualitative and quantitative testing device.

Also my invention provides a device of the character indicated that may be used by unskilled operatives, enabling such readily to test and ascertain both qualitatively and quantitatively the character and contents of solutions, liquors and the like, without requiring special knowledge of the nature or character of the reagents or reactions employed or the calculations involved.

Also my invention provides a tool that may be used, and accurate tests made, in situations and conditions wherein testing devices hitherto known and used could not be employed, as, for example, on ships, boats, trains and conveyances where the oscillation or vibration causes constant shifting of levels and precludes reading of level marks or graduations as usually employed in instruments of this character.

I have illustrated one form of my invention in the accompanying drawing, it being understood that it is not restricted to the specific form shown but may be embodied in other and modified forms. The form I have chosen for illustration is more particularly adapted to the testing of boiler water for steam engines and particularly for marine boilers, for which purpose my invention is especially adapted, as will more fully appear.

Figure 1:
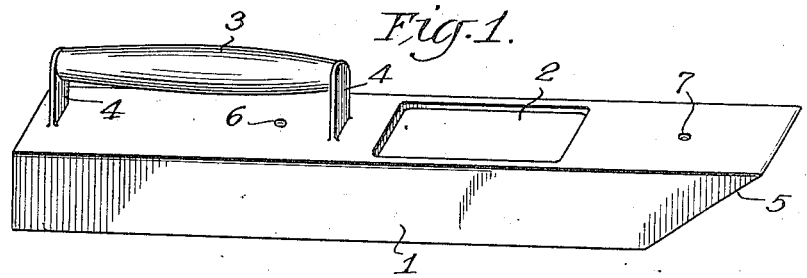

Fig. 1 of the accompanying drawing shows the instrument in a horizontal or resting position.

Figure 2:
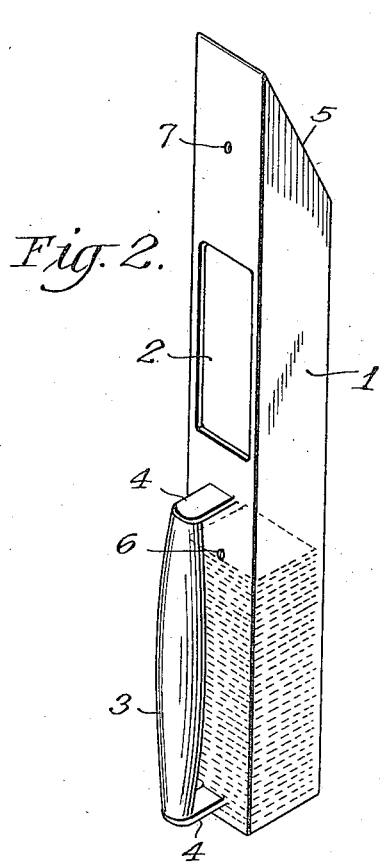
Figure 3:
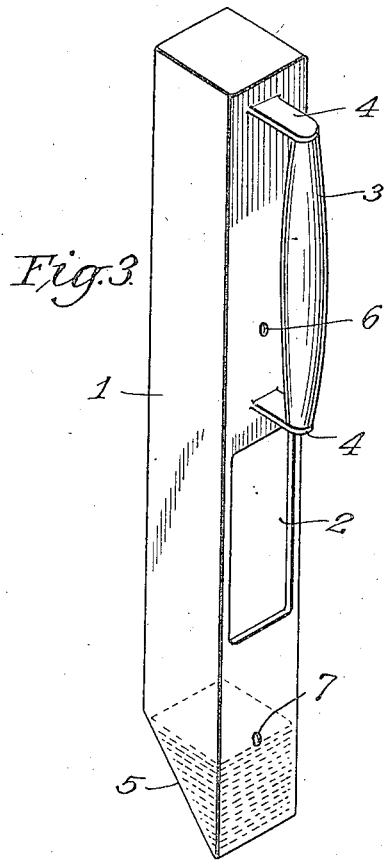

Fig. 2 shows the instrument in vertical position for measuring one definite quantity of liquid to be tested, and Fig. 3 shows the instrument in reversed position with respect to Figure 2 for measuring a smaller definite quantity of the liquid to be tested.

Referring to the drawing, the device is in the form of an elongated box or receptable, preferably constructed of metal or composition that is either itself inert to the liquids and reagents with which it comes in contact, or that is coated with enamel or paint similarly inert. As shown, the box or receptacle 1, is generally rectangular or square in cross-section, this form not only affording compactness and facility of packing in a portable "testing outfit", or compartment thereof, along with the vials or bottles containing the requisite reagents, but also affording a flat bottom or base on which the instrument may stand, as in Figure 1, without upsetting or loss of contents when in use, and without requiring a holder or special support.

The box or receptacle 1 is closed on all sides and ends, except for an opening or mouth 2, through which the same is filled and emptied. On the upper side or wall, on one side of said opening, a handle 3 is provided of any convenient and suitable form. The handle 3 may be supported in ears 4, 4, projecting from the upper side of the device, which ears may be soldered, brazed, welded or otherwise secured to said side or wall of the device.

The box or receptacle 1 is narrowed or tapered as at 5 to reduce its capacity or dimensions at this end for a purpose hereafter more fully explained.

In the upper side or wall of the receptacle 1 are provided two orifices or apertures 6 and 7, respectively, the latter being in the narrowed or tapered end of the instrument. These orifices are so placed, respectively, that the levels of the liquid in the receptacle determined thereby measure definite quantities, and preferably the quantity measured by the orifice in the narrowed end of the receptacle is a definite proportion or aliquot part of that measured by the larger end of the receptacle. The purpose and function of these orifices will more fully appear in the following.

The interior of the receptacle 1 should present a white surface in order to show readily the color changes of the liquid being tested. This may be obtained by coating the interior surface of the receptacle with a white inert enamel, paint or varnish.

As before stated the instrument as shown and described is especially adapted for the testing of boiler water for marine and boat engines. In using it for this purpose, the presence and proportion of alkali and chlorine are principally tested for, to determine whether the water is suitable for use in the boilers, or whether it requires treatment to render it suitable. For such purpose the instrument is operated as follows: For determining the alkali content, the instrument, held more or less horizontally by its handle 3 is dipped into the water to be tested so that a quantity thereof enters through opening 2. It is then withdrawn and held in vertical position, as in Fig. 2, with the tapered or narrowed end 5 uppermost. Thereupon the surplus water will escape until the level thereof retained in the instrument rests at the level of the orifice 6. This orifice is so placed that with the instrument in the vertical position described it automatically measures a definite quantity of the water retained in the instrument; for this purpose, say six cubic inches, or 100 c. c. The measured amount of water having been thus obtained, the instrument is turned to a substantially horizontal position and a suitable alkali test reagent or indicator, say phenolphthalein, is added, and mixed well with the water in the instrument by tilting or rocking the latter. If the water is alkaline the contents of the instrument will turn a red color, the white interior surface of the instrument making the color change readily perceptible. If this color change does not occur the water is acid or corrosive to the boilers and the engineer will accordingly be so informed and add alkali to the boiler water. Assuming the red color shows, indicating alkaline water, it is required to know what proportion of alkali the water contains. The instrument provides means also for determining this. Acid of definite strength is added by counted drops to the contents of the instrument, mixing well between the drops by tilting or rocking the instrument, until the red color disappears, a point readily perceptible owing to the white interior surface of the instrument. The number of drops of acid required to effect this color change in the measured quantity (6 cu. in.) of water in the receptacle will indicate the number of grains of alkali (soda ash) in each gallon of the water. The engineer will thus readily ascertain whether the alkali content of his boiler water exceeds the allowable or proper limit.

The instrument also provides for determining the chlorine content or salinity of the boiler water. For this purpose a quantity of the water is dipped up with the tool held substantially horizontally, as before described. It is then turned and held in vertical position with its narrowed or tapered end lowermost, as in Fig. 3. Or, the same sample, tested for alkali may be used for determining the chlorine content by turning the instrument into vertical position with the narrowed end lowermost. In either case the surplus water will run out of the instrument until the quantity retained therein reaches the level determined by aperture 7. This aperture is so placed and the narrowed dimensions of the instrument at this end are such as to automatically measure this retained quantity as, say, six-tenths of a cubic inch, or 10 c. c. The instrument is then turned substantially horizontal. Thereupon several drops of an indicator, such as potassium chromate are added and mixed well with the retained contents of the instrument by tilting or rocking the same until the liquid assumes a yellow color. Then silver nitrate is slowly added thereto by counted drops, mixing well between drops, as described, until the color changes from yellow to red and remains red. For each drop of the latter reagent required to effect this latter color change ten grains of chlorine per gallon are present in the water.

If the water to be tested should taste fresh, containing, say, less than 50 grains chlorine per gallon, more accurate results may be obtained by using the larger (or six cu. inches) end of the instrument to measure the quantity taken for test. In that case, the test is performed as before, but one grain of chlorine per gallon is counted for each drop of the silver nitrate required to produce the permanent red color.

Where the water to be tested is very dense or salt, containing, say, over 500 grains of chlorine per gallon, sufficiently accurate results may be more quickly obtained by first diluting the water to ten per cent before applying the reagents. My instrument readily provides for this condition and method by using the same as follows:—Fill, in the manner before described, the narrowed end with the water to be tested by turning the instrument to the position shown in Fig. 3; then slowly invert the instrument until the larger end is lowermost, as in Figure 2; then slowly add fresh water through opening 2 until the level reaches aperture 6. Since the capacity of the narrowed end is one-tenth that of the larger end an accurate ten per cent dilution is thus readily obtained. The instrument is then again inverted till the narrowed end is lowermost, Figure 3, allowing the excess to escape through aperture 7 until the level rests at that point. The reagents are then applied as before, but for every drop of the silver nitrate solution required to change the yellow color to permanent red 100 grains of chlorine per gallon are present in the water.

From the foregoing it will be apparent that my invention provides a testing instrument having many important advantages. Heretofore, for tests such as described more or less delicate glass instruments have been required and the services of more or less skilled analysts or chemists to use them. Such instruments are subject to breakage, particularly on voyages and expeditions where it is impossible to replace them. Furthermore such instruments require the reading of liquid levels against graduation marks on glass tubes or the like; but the rolling and pitching of ships and the vibration of engines producing corresponding changes constantly in the liquid levels, render such readings practically impossible. My invention obviates these difficulties and disadvantages, since the instrument is of rugged construction, and, being of metal or like material, is unbreakable. Having no graduation marks, no reading of a shifting liquid level is required, the definite measurements being automatically made by the overflow of the liquid. No special skill is required in the use of the instrument other than holding it in the required positions and counting drops. Its white interior renders color changes readily visible, and it requires no supporting stand, since its form and flat bottom surface enables it to stand securely on a table or shelf and insures against it being overturned, while the intermediate position of the opening 2 between the closed or covered in ends prevents slopping over of the contents that might otherwise occur from oscillations or vibrations of a ship, boat or conveyance on which it was used. It may readily be packed, taking up little space, in a case or compartment, along with the vials and droppers holding a supply of the reagents referred to, the whole forming a compact, complete testing outfit readily carried on ships, trains and the like and used in places generally inaccessible to ordinary testing on chemical appliances, and by persons other than skilled analysts or chemists.

Various changes and modifications may be made in the form and details of my invention, and it may be employed for testing various other liquids, without departing from the essential principles thereof.

Having thus described my invention what I claim as new and desire to secure by Letters Patent is:

1. An instrument of the character described comprising a receptacle having a mouth in one side thereof intermediate the ends, and a contents-measuring orifice in said side between said mouth and one of the ends, whereby the receptacle may be filled when said side is in a substantially horizontal position and its contents measured when said side is in a substantially vertical position.

2. An instrument of the character described comprising a receptacle having closed sides and ends, a mouth in one side intermediate the ends, and a contents-measuring orifice on each side of said mouth and between the same and the respective ends, said orifices positioned to measure respectively a larger and a smaller quantity of liquid when one end of the instrument or the other is in a downward position.

3. An instrument of the character described comprising a receptacle having one end portion thereof of narrower cross-section than the other, a mouth in one side of the receptacle intermediate said end portions, and a contents-measuring orifice in each of said end portions.

4. An instrument of the character described comprising a receptacle closed as to its sides and ends, a mouth in one side thereof intermediate the ends, a contents-measuring orifice between said mouth and one end, and a similar orifice between said mouth and the other end, said orifices being positioned respectively to measure automatically different and relatively proportional quantities of liquid in the receptacle when the receptacle is turned with one or the other end downward.

5. An instrument of the character described comprising a receptacle closed as to its sides and ends, said receptacle having a larger interior cross section throughout a portion of its length, and having a smaller cross-section in the remainder of its length, a mouth in one side of said receptacle intermediate its ends, a contents-measuring orifice in the larger cross-sectional portion of the receptacle, and a similar orifice in the portion having the smaller cross-section.

6. An instrument of the character described comprising a receptacle closed as to its sides and ends, a mouth in one of said sides intermediate the ends, a contents-measuring orifice in said side, and a flat surface on the opposite side to form a bottom on which the instrument may rest.

JOHN B. PATTON.